United States Patent
Yip

(10) Patent No.: US 7,265,928 B2
(45) Date of Patent: Sep. 4, 2007

(54) DATA STORAGE CARTRIDGE WITH WORM WRITE-PROTECTION

(75) Inventor: Yung Yip, Afton, MN (US)

(73) Assignee: Imation Corp., Oakdale, MN (US)

( * ) Notice: Subject to any disclaimer, the term of this patent is extended or adjusted under 35 U.S.C. 154(b) by 83 days.

(21) Appl. No.: 11/338,550

(22) Filed: Jan. 24, 2006

(65) Prior Publication Data

US 2007/0171561 A1 Jul. 26, 2007

(51) Int. Cl.
*G11B 19/02* (2006.01)

(52) U.S. Cl. .................................................. 360/69

(58) Field of Classification Search ............... 360/69, 360/55, 53, 122; 711/163; 369/30.01; 710/62; 714/5
See application file for complete search history.

(56) References Cited

U.S. PATENT DOCUMENTS

| | | | |
|---|---|---|---|
| 5,016,123 A | 5/1991 | Karsh | |
| 5,278,753 A * | 1/1994 | Graft, III | 705/12 |
| 6,330,572 B1 | 12/2001 | Sitka | |
| 6,369,982 B2 * | 4/2002 | Saliba | 360/122 |
| 6,543,983 B1 * | 4/2003 | Felder et al. | 414/402 |
| 7,103,698 B2 * | 9/2006 | Zhang et al. | 710/303 |
| 7,162,602 B2 * | 1/2007 | Kodama | 711/163 |
| 2003/0165373 A1 * | 9/2003 | Felder et al. | 414/331.07 |
| 2005/0188246 A1 * | 8/2005 | Emberty et al. | 714/5 |
| 2005/0235076 A1 * | 10/2005 | Winarski et al. | 710/62 |
| 2005/0287852 A1 * | 12/2005 | Sugawara et al. | 439/135 |
| 2006/0013078 A1 * | 1/2006 | Goodman et al. | 369/30.01 |

* cited by examiner

*Primary Examiner*—Fred F. Tzeng
(74) *Attorney, Agent, or Firm*—Eric D. Levinson

(57) ABSTRACT

A data storage cartridge is equipped with write-once-read-many (WORM) write-protection. The cartridge is compatible with an existing cartridge docking station with a modification to the control logic of the docking station's control module. Specifically, the control logic is altered to recognize that sensing magnets with both sensors requires the docking station to allow data to be written to, but not erased or altered on the cartridge. In this manner, a third possibility of write-protection status is added to the two existing possibilities of full write-protection and no write-protection. Some embodiments of the invention also provide redundant indications of the WORM write-protection status of the cartridge. For example, embodiments of the invention may incorporate a radio-frequency identification (RF) tag within the cartridge and/or a status bit written into a designated WORM register within a media information header during pre-format of the cartridge media.

20 Claims, 4 Drawing Sheets

| STATUS BIT | WRITE PROTECTION STATUS |
|---|---|
| 0 | NO WORM WRITE-PROTECT |
| 1 | WORM WRITE-PROTECT |

FIG. 2

DATA STORAGE CARTRIDGE WITH WORM WRITE-PROTECTION

TECHNICAL FIELD

The invention relates to write-protection for data storage cartridges, such as magnetic tape cartridges.

BACKGROUND

A current data storage cartridge containing a data storage media commonly includes a magnet embedded in a slider. The slider can be manually set to one of two positions to indicate the write-protection status of the cartridge. One of the positions represents that data on the cartridge is write-protected, i.e., data cannot be erased from or written to the cartridge. The other position represents that data on the cartridge is not write-protected, meaning data can be both erased from and written to the cartridge. A docking station for the cartridge includes two magnetic sensors to detect the position of the slider when the cartridge is inserted into the docking station. One sensor is located proximate to each possible position setting of the slider. A control module of the docking station uses the slider position information as an input to execute the write-protection status of the inserted cartridge.

SUMMARY

A data storage cartridge is equipped with write-once-read-many (WORM) write-protection implemented by a docking station. For example, in some embodiments, the data storage cartridge is a magnetic tape cartridge, and the docking station is a tape cartridge drive. WORM write-protection allows data to be written to a data storage media within the cartridge, but the data cannot be modified or erased once written. Instead of having a slider with an embedded magnet having two possible positions, the cartridge includes one or more magnets covering both positions. The cartridge is compatible with an existing cartridge docking station with a modification to the control logic of the docking station's control module. Specifically, the control logic is altered to recognize that sensing magnets with both sensors requires the docking station to allow data to be written to, but not erased or altered on the cartridge. In this manner, a third possibility of write-protection status is added to the two existing possibilities of full write-protection and no write-protection. Some embodiments of the invention also provide redundant indications of the WORM write-protection status of the cartridge. For example, embodiments of the invention may incorporate a radio-frequency identification (RF) tag within the cartridge and/or a status bit written into a designated WORM register within a media information header during pre-format of the cartridge data storage media.

In one embodiment, a data storage cartridge comprises a cartridge housing, a data storage medium within the cartridge housing, and one or more magnets located on the cartridge housing such that two sensors of a docking station simultaneously detect magnetic fields when the data storage cartridge is interfaced with the docking station.

In another embodiment, a docking station for a data storage cartridge comprises an interface to receive the data storage cartridge, a first magnetic sensor that sends a first signal to indicate detection of a first magnetic field proximate to the first magnetic sensor, a second magnetic sensor that sends a second signal to indicate detection of a second magnetic field proximate to the second magnetic sensor and a control module that receives the first and second signals. The control module implements WORM write-protection for the data storage cartridge when the first magnetic sensor detects the first magnetic field and the second magnetic sensor detects the second magnetic field.

In another embodiment, a system comprises a data storage cartridge and a docking station for data storage cartridges. The data storage cartridge includes a cartridge housing, a data storage medium within the cartridge housing, and one or more magnets located on the cartridge housing. The docking station includes an interface to receive the data storage cartridge, a first magnetic sensor that sends a first signal to indicate detection of a first magnetic field of the one or more magnets, a second magnetic sensor that sends a second signal to indicate detection of the first magnetic field or a first magnetic field of the one or more magnets, and a control module that receives the first and second signals. The control module implements WORM write-protection for the data storage cartridge when the first and second magnetic sensors each detect magnetic fields.

Various embodiments of the invention may provide one or more advantages. Some embodiments provide for a docking station compatible with existing cartridges, but also compatible with WORM write-protected cartridges. For example, an existing docking station may be upgraded, e.g., a software upgrade, to support WORM write-protected cartridges. In this manner, embodiments of the invention provide cost effective techniques to implement WORM write-protection using pre-existing systems. Embodiments that include redundant write-protection indicators ensure reliable write-protection and hinder efforts to counteract such write-protection. Numerous laws, governmental regulations, industry associations and internal company policies set standards regarding record-keeping and data back-up.

Embodiments of the invention may also provide controllable, reliable and secure data storage integrity capable of meeting strict governmental and business standards. For example, the Sarbanes-Oxley Act of 2002 provides strict penalties for companies and individuals for intentional alteration or destruction of certain records. In light of the Sarbanes-Oxley Act and other regulations, embodiments of the invention may be useful to meet regulatory standards and to prove stored records have not been altered.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 2 is a table showing the function of a WORM status bit, which can be stored on the data storage media of a data storage cartridge, such as in a media information header.

DETAILED DESCRIPTION

Figure 1:
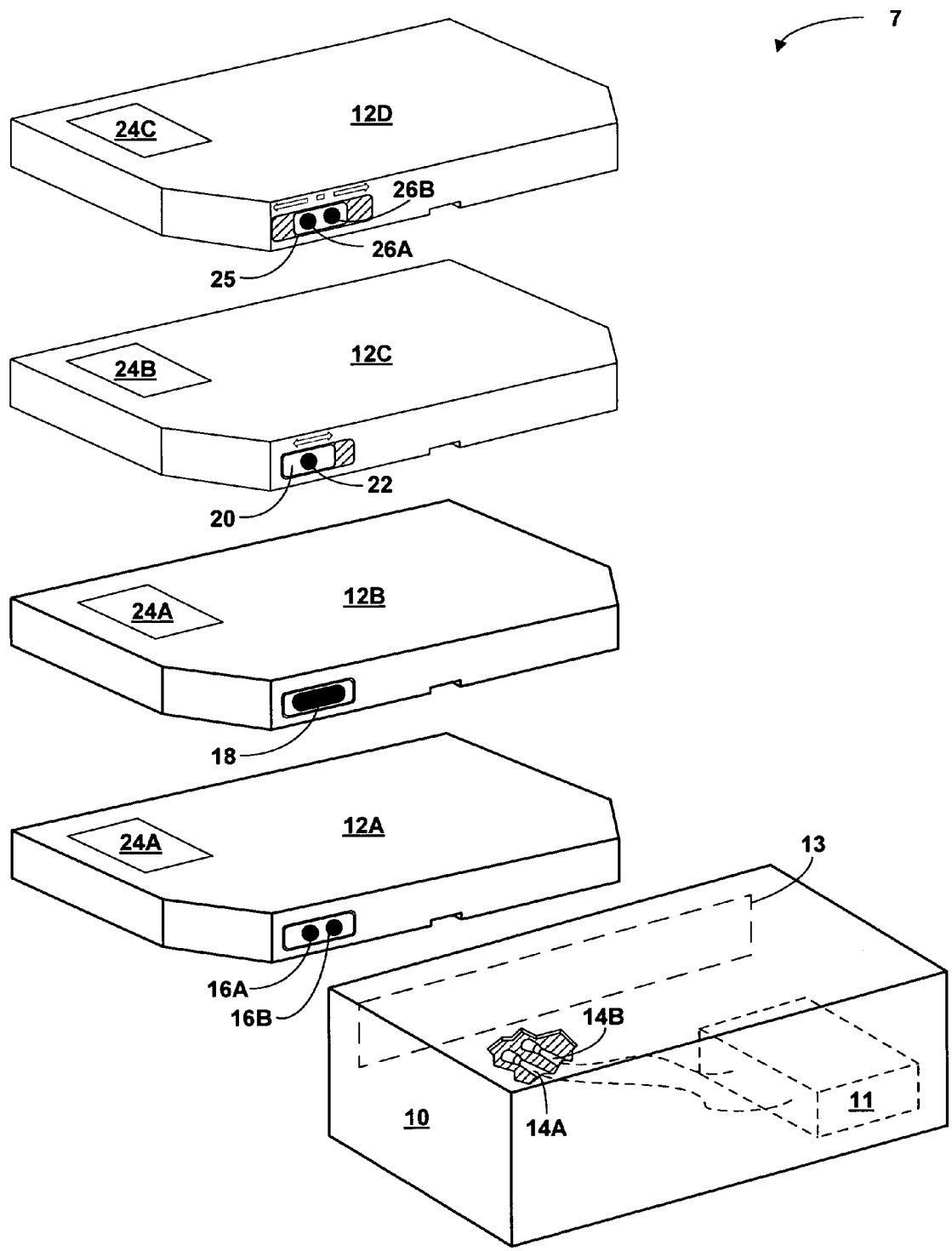
FIG. 1 is a perspective view illustrating a docking station and several data storage cartridges compatible with the docking station according to one or more embodiments of the invention.

FIG. 1 is a perspective view illustration of system 7 including docking station 10 and one of data storage cartridges 12A-12D (cartridges 12), each compatible with docking station 10. Docking station 10 can read data from a cartridge inserted in receptacle 13. Docking station 10 includes sensors 14A-14B (sensors 14) to read a write-protection status of an inserted cartridge. For example, sensors 14 may be magnetic field sensors, e.g., Hall-effect sensors.

In different embodiments, docking station 10 may read cartridges utilizing one of a variety of data storage media including, but not limited to: magnetic tape, optical discs, magneto-optic discs, magnetic discs and the like. Docking station 10 includes control module 11 that recognizes three write-protection statuses: full-write-protection, no write-protection and WORM write-protection. Control module 11 receives inputs from sensors 14. Sensors 14 each send a signal indicating the existence or the non-existence of a magnet proximate to the sensor. Using both signals as inputs, control module 11 determines and implements the write-protection status of an inserted cartridge. Docking station 10 may be a pre-existing docking station with upgraded control logic to recognize WORM write-protection in addition to full-write-protection, no write-protection. For example, docking station 10 may include a software upgrade, to allow support of WORM write-protected cartridges.

When only sensor 14A, and not sensor 14B, detects a magnetic field from a magnet proximate to sensor 14A and within an inserted cartridge, control module 11 recognizes that the inserted cartridge has no write-protection. Control module 11 then allows data to be written to and erased from the cartridge. When only sensor 14B, and not sensor 14A, detects a magnetic field, control module 11 recognizes that the inserted cartridge has full write-protection. Then control module 11 does not allow data to be written to or erased from the inserted cartridge. When both sensors 14A and 14B detect a magnetic field, control module 11 recognizes that the inserted cartridge has WORM write-protection. Control module 11 then allows that data can be written to, but not erased from the cartridge.

In various embodiments, if neither sensor 14 detects a magnetic field, control module 11 may perform one or more of the following actions: determine no cartridge is inserted, produce an error message via a user interface of a computing device, prevent access to an inserted cartridge, assume an inserted cartridge has no write-protection, assume an inserted cartridge has full write-protection, assume an inserted cartridge has WORM write-protection, look to a redundant write-protection status indicator of the cartridge to determine its write-protection status, request a user input to determine write-protection status of an inserted cartridge or perform a different action.

Control module 11 and the functions thereof may be implemented by executing instructions within computer-readable medium with one or more processors, discrete hardware circuitry, firmware, software executing on a programmable processor, or combinations thereof. In this manner, control module 11 is not necessarily contained within a common housing, or as a single unit, e.g., portions of control module 11 may be separate from sensors 14 and other physical components of docking station 10.

Data storage cartridges 12 can be interfaced with docking station 10 by inserting one of cartridges 12 within receptacle 13. Cartridges 12 may use any of a variety of data storage media including but not limited to: magnetic tape, optical discs, magneto-optic discs, magnetic discs and the like. Data storage cartridges 12 each include indications of the write-protection status.

Cartridges 12A and 12B have WORM write-protection. Permanent magnets 16A-16B (magnets 16) on cartridge 12A are located such that when cartridge 12A is inserted into receptacle 13 of docking station 10, sensors 14A and 14B will each detect a magnetic field. Sensor 14A detects a magnetic field from magnet 16A and sensor 14B detects a magnetic field from magnet 16B. Similarly, permanent magnet 18 on cartridge 12B is located such that when cartridge 12B is inserted into receptacle 13 of docking station 10, sensors 14A and 14B will each detect a magnetic field from permanent magnet 18. Cartridges 12A and 12B include magnets 16 and 18 that create magnetic fields detected by both of sensors 14; therefore, when one of cartridges 12A and 12B is inserted in docking station 10, control module 11 implements WORM write-protection. Because magnets 16 and 18 are fixed, cartridges 12A and 12B do not include selectable write-protection and only allow WORM write-protection.

In contrast, cartridge 12C has selectable write-protection. Cartridge 12C includes a slider 20 with a single permanent magnet 22. Slider 20 can be manually set to one of two positions to indicate the write-protection status of cartridge 12C. One of the positions represents full write-protection; the other represents no write-protection. One of magnetic sensors 14 detects the position of the slider when cartridge 12C is inserted into receptacle 13. As shown in FIG. 1, slider 20 is set to the left: representing that cartridge 12C currently has no write-protection. When cartridge 12C is inserted into receptacle 13, magnet 22 is detected by sensor 14A, but not sensor 14B. Control module 11 receives signals from sensors 14 and implements no write-protection for cartridge 12C. If slider 20 is set to the right, magnet 22 is detected by sensor 14B, but not sensor 14A, and control module 11 implements full write-protection for cartridge 12C. The write-protection status of cartridge 12C can be changed repeatedly between full protection and no protection; however, cartridge 12C cannot be set to have WORM write-protection in which both of sensors 14A and 14B simultaneously detect magnetic fields.

Cartridge 12D has selectable write-protection provided by slider 25. Slider 25 can be set to one of three positions, corresponding to three different statuses of write-protection: full write-protection, WORM write-protection, and no write-protection. As shown in FIG. 1, slider 25 is set to the middle position: representing that cartridge 12C currently has WORM write-protection. When cartridge 12D is inserted into receptacle 13, magnet 26A is detected by sensor 14A and magnet 26B is detected by sensor 14B. Control module 11 receives signals from sensors 14 and implements WORM write-protection for cartridge 12C. If slider 25 is set to the left, magnet 26B is detected by sensor 14A, but sensor 14B does not detect a magnetic field. Then, control module 11 implements no write-protection for cartridge 12D. If slider 25 is set to the left, magnet 26A is detected by sensor 14B, but sensor 14A does not detect a magnetic field. Then, control module 11 implements full write-protection for cartridge 12D. In a similar embodiment that is functionally equivalent to cartridge 12D, magnets 26A and 26B on slider 25 may be replaced with a single larger magnet, like magnet 18.

In some embodiments, data storage cartridges 12 may further include RF tags 24A-24C (RF tags 24), which provide redundant write-protection status information to control module 11. RF tags 24A indicate that data storage cartridges 12A and 12B have WORM write-protection. In contrast, RF tag 24B indicates that cartridge 12C has a selectable write-protection status corresponding to either full write-protection or no write-protection. RF tag 24C indicates that cartridge 12D has a selectable write-protection status corresponding to any of full write-protection, WORM write-protection and no write-protection. In some embodiments, control module 11 can read RF tags 24 to confirm a write-protection status of an inserted cartridge 12. RF tags 24 may simply include a unique identifier for each cartridge, and control module 11 may have to refer to a database in order to correlate that unique identifier with a write-protection status of the cartridge.

RF tags 24 may include additional information about cartridges 12. For example, RF tags 24 may include information about the content of cartridges 12, the source of such information or other information. As another example, RF tags 24 may each include a unique identifier, which can be used to correlate the cartridge 12 with a database having information about multiple cartridges 12 categorized according to unique identifiers in RF tags 24. For example, such a database may also include information regarding the content of cartridges 12, the source of such information or other information. In summary, the function of RF tags 24 is not limited to write-protection status indication.

One of cartridges 12 may also include a status bit within a media information header on data storage media of the cartridge 12. The status bit within a media information header provides a redundant indication of the write-protection status of the cartridge 12. Techniques for implementing a WORM status bit within a media information header are described in greater detail in the description corresponding to FIG. 2.

FIG. 2 is a table showing the function of a WORM status bit in a media information header. For example, a data storage media within one of cartridges 12 of FIG. 1 may include a media information header with a WORM status bit as shown in FIG. 2. In other embodiments, the WORM status bit could be stored other places on the media, not necessarily in a header file. In different embodiments, the data storage media may comprise magnetic tape, optical discs, magneto-optic discs, magnetic discs and the like. In any case, the WORM status bit (or other such WORM information) can be stored on the media to provide redundant logical WORM information, in addition to the physical WORM information provided by the one or more magnets that interface with sensors of the docking station.

As shown in FIG. 2, the WORM status bit can be set to either "0" or "1". "0" represents that the data storage media does not have WORM write-protection. In contrast, "1" represents that the data storage media is WORM write-protected. The WORM status bit within a media information header cannot be changed by a user, but is set during a pre-format of a data storage media during manufacture of a data storage cartridge.

In other embodiments, a media information header may include write-protection information in more than one bit. For example, a media information header may include two bits to represent a write-protection status of the data storage media. With two bit there are four possible combinations. One combination may represent that a cartridge has a variable write-protection status, e.g., the cartridge includes a slider that may be manually set to indicate a write-protection status. The other three combinations may be used to indicate one of three permanent write-protection statuses: full write-protection, WORM write-protection and no write-protection. Other possibilities of encoding write-protection status within a media information header are also possible.

Control module 11 may look to a media information header on a data storage media when a cartridge is inserted into receptacle 13 to confirm a write-protection status of the cartridge. Again, this can provide logical WORM functionality that is redundant with physical WORM functionality, e.g., functionality provided by magnets 16 in cartridge 12A relative to sensors 14 of docking station 10. Such physical and logical redundancy may be required to meet regulatory standards. Furthermore, physical and logical redundancy allows WORM write-protection status of a cartridge to be recognized in systems that do not include physical sensors, but support the logical read of a WORM status bit.

Figure 3:
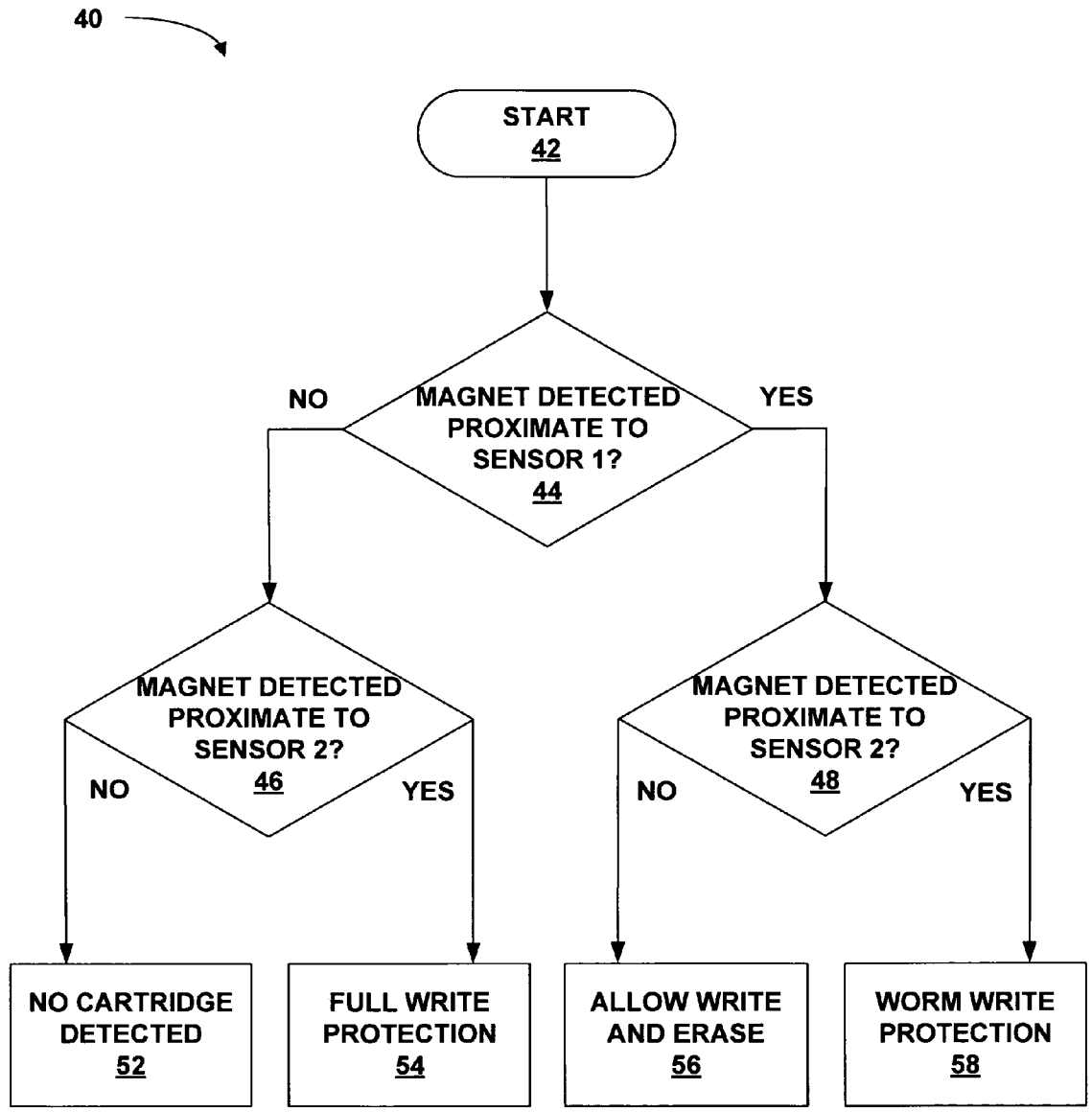
FIG. 3 is a flowchart illustrating a technique for determining the write-protection status of a data storage cartridge interfaced with a docking station according to an embodiment of the invention.

FIG. 3 is a flowchart of method 40 to determine the write-protection status of a data storage cartridge inserted into a docking station. For clarity, method 40 will be described with respect to docking station 10 from FIG. 1, although method 40 may be implemented in other systems as well.

First, one of cartridges 12 is interfaced with docking station 10; specifically, one of cartridges 12 is inserted within receptacle 13 (42). Control module 11 receives a signal from magnetic sensor 14A (44). Control module 11 also receives a signal from magnetic sensor 14B (46 and 48).

If neither of sensors 14 detect a magnetic field, control module 11 determines that no cartridge was detected (52). In other embodiments, for example, if control module 11 receives a separate input to determine if a cartridge has been inserted, control module 11 may perform one or more of the following actions: produce an error message, prevent access to an inserted cartridge, assume an inserted cartridge has no write-protection, assume an inserted cartridge has full write-protection, assume an inserted cartridge has WORM write-protection, look to a redundant write-protection status indicator of the cartridge to determine its write-protection status, request a user input to determine write-protection status of an inserted cartridge or perform a different action.

If only sensor 14B, and not sensor 14A, detects a magnetic field, control module 11 determines that the inserted cartridge has full write-protection. In this case, control module 11 does not allow data to be written to or erased from the inserted cartridge (54). If only sensor 14A, and not sensor 14B, detects a magnetic field, control module 11 determines that the inserted cartridge has no write-protection. Control module 11 then allows data to be written to and erased from the cartridge (56). When both sensors 14A and 14B detect a magnetic field, control module 11 determines that the inserted cartridge has WORM write-protection. Control module 11 then allows on that data can be written to, but not erased from the cartridge (58).

Control module 11 may look to one or more redundant write-protection status indicators of the cartridge in combination with using sensors 1 and 2 to detect magnets. For example, control module 11 may look for one of RF tags 24 (FIG. 1) and/or a status bit in a data information header. Assuming the redundant write-protection status indicators of the cartridge are consistent, control module 11 would implement the corresponding write protection. In the event that the redundant write-protection status indicators are inconsistent, control module 11 may perform one or more of the following actions: produce an error message, prevent access to an inserted cartridge, assume an inserted cartridge has no write-protection, assume an inserted cartridge has full write-protection, assume an inserted cartridge has WORM write-protection, implement write-protection according to a hierarchy of the available write-protection status indicators, request a user input to determine write-protection status of an inserted cartridge or perform a different action.

Figure 4:
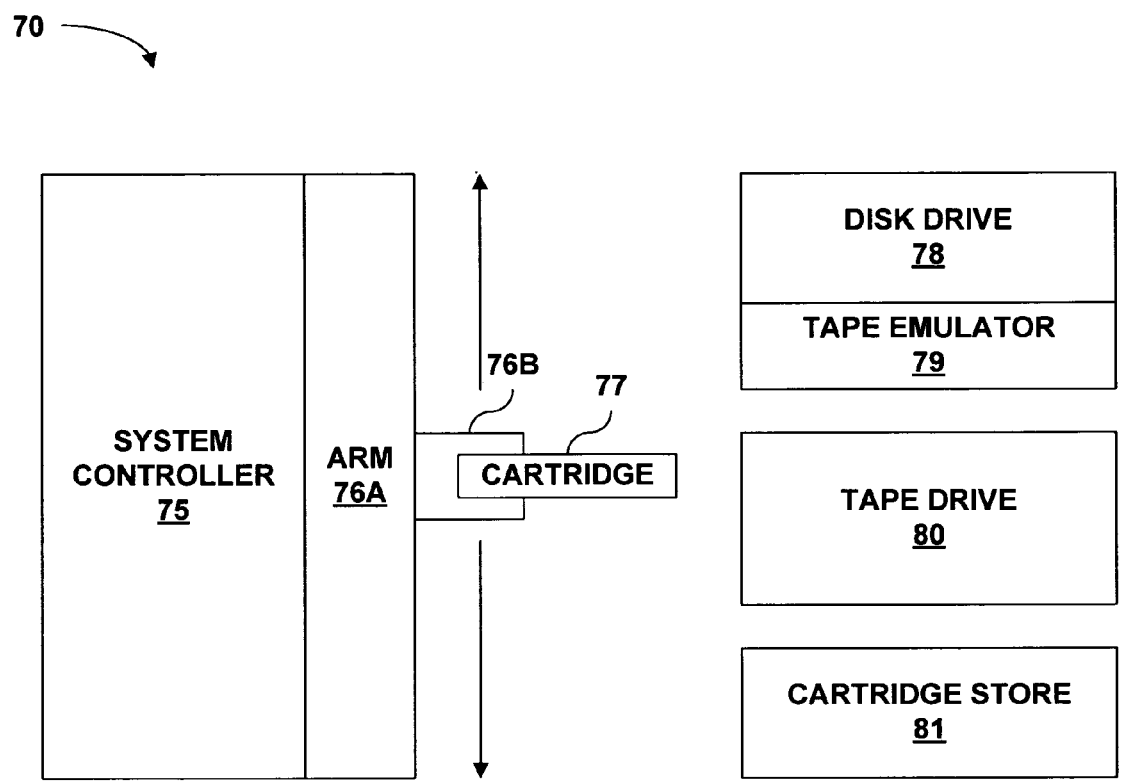
FIG. 4 is a block diagram illustrating an automated data storage cartridge library system that may implement one or more aspects of the invention.

FIG. 4 is a block diagram illustrating an automated data storage cartridge library system 70. System 70 incorporates cartridges with different data storage media including but not limited to: magnetic tape, optical discs, magneto-optic discs, magnetic discs and the like. System 70 may comprise a tape cartridge library system that also includes a data storage disk drive 78 coupled to a tape drive emulator 79. A system controller 75 selectively retrieves a data storage cartridge 77 from a cartridge store 81 and loads the retrieved data storage cartridge 77 into either disk drive 78 or tape drive 80. When the drive is finished with the data storage cartridge 77, system controller 75 retrieves the data storage cartridge 77 from the drive and returns it to the assigned storage location within cartridge store 81. Disk drive 78 and tape drive 80 each function as docking stations for data storage cartridges. For example, each of disk drive 78 and tape drive 80 may include the features of docking station 10 described with respect to FIG. 1 to facilitate WORM write-protection, full write-protection, or no write-protection.

A computing device (not shown) communicates with system controller 75 to direct operation of the data storage cartridge library system 70. In response to an access request from the computing device, system controller 75 generates control signals to direct a robot arm 76A and a gripper 76B to retrieve the appropriate data storage cartridge from cartridge store 81 and insert the data storage cartridge into one of drives 78 or 80. In response to the signals, robotic arm 76A traverses cartridge store 81 and engages a cartridge 77 using gripper 76B. Upon insertion of data storage cartridge 77 into one of drives 78 or 80, the computing device can write data to, and read data from, the data storage cartridge depending on the write-protection status of the cartridge.

Cartridge store 81 provides a plurality of data storage cartridge storage locations. The data storage cartridges may comprise magnetic tape cartridges for use with tape drive 80 or data storage disk cartridges for use with disk drive 78. The data storage disks may comprise blue disk media, i.e., optical disk media having a data storage capacity greater than approximately 75 GB. The data storage disk cartridges may include a plurality of data storage disk enclosed within the cartridge housing.

Regardless of the media type, each data storage cartridge includes a cartridge housing comprising dimensions that conform to a standard tape cartridge form factor and features for engagement by system controller 75. In addition, the data storage cartridges may have some type of identifying information, such as a label, a bar code, or a radio frequency (RF) tag, by which the system controller 75 identifies the individual data storage cartridges. In this way, cartridges housing different types of media can be mechanically indistinguishable by system controller 75.

Data storage disk drive 78 may include a tape drive emulator such that the data storage disks appear to the computing device as sequential storage devices. Specifically, tape drive emulator 79 communicates with the computing device as a conventional tape drive. For example, in response to a query from the computing device, tape drive emulator 79 may identify disk drive 78 as a conventional tape drive, such as a standard 9940 tape drive. Consequently, the drivers and other software applications executing on the computing device for accessing tape cartridges need not be modified.

As for the data storage disk cartridges, tape drive emulator 79 may be physically configured for use with conventional backup infrastructure, such as automated tape cartridge library system 70. For example, disk drive 78 and tape drive emulator 79 may conform to a substantially similar dimension and form factor as conventional tape drive 80 and may be readily inserted within a drive bay of automated tape cartridge library system 70. In this manner, data storage disk cartridges physically appear the same as magnetic tape data storage cartridges from the perspective of system controller 75, and functionally appear the same from the perspective of the computing device.

A number of embodiments of the invention have been described. For example, a docking station is compatible with both WORM write-protected cartridges and cartridges allowing full or no write-protection. Nevertheless, various modifications may be made to the embodiments described above. For example, in some embodiments, a docking station may not provide backwards compatibility with current cartridges. As an example, a docking station may require cartridges with a different form factor or using different data storage medium than currently used. Accordingly, these and other embodiments are within the scope of the following claims.

The invention claimed is:

1. A data storage cartridge comprising:
a cartridge housing;
a data storage medium within the cartridge housing; and
one or more magnets located on the cartridge housing such that two sensors of a docking station simultaneously detect magnetic fields when the data storage cartridge is interfaced with the docking station.

2. The data storage cartridge of claim 1, wherein the one or more magnets indicate that the data storage cartridge is write-once-read-many (WORM) write-protected.

3. The data storage cartridge of claim 1, wherein the one or more magnets consist of two permanent magnets.

4. The data storage cartridge of claim 1, further comprising a radio frequency (RF) tag, wherein the RF tag indicates the data storage cartridge is WORM write-protected.

5. The data storage cartridge of claim 1, wherein the data storage medium stores information that indicates the data storage cartridge is WORM write-protected.

6. The data storage cartridge of claim 1, wherein the data storage cartridge interfaces with the docking station when inserted within a receptacle of the docking station such that the one or more magnets of the data storage cartridge are proximate the two sensors of the docking station.

7. The data storage cartridge of claim 1, wherein the data storage medium comprises magnetic tape.

8. The data storage cartridge of claim 1, further comprising a slider with three selectable positions: a first position, a middle second position and a third position, wherein the one or more magnets are mounted on the slider and the two sensors both detect the magnetic fields only when the slider is set to the middle second position.

9. A docking station for a data storage cartridge comprising:
an interface to receive the data storage cartridge;
a first magnetic sensor that sends a first signal to indicate detection of a first magnetic field proximate to the first magnetic sensor;
a second magnetic sensor that sends a second signal to indicate detection of a second magnetic field proximate to the second magnetic sensor; and
a control module that receives the first and second signals, wherein the control module implements WORM write-protection for the data storage cartridge when the first magnetic sensor detects the first magnetic field and the second magnetic sensor detects the second magnetic field.

10. The docking station of claim 9, wherein the first and second sensors are positioned to detect a first magnet, located on a cartridge housing of the data storage cartridge, that emits the first magnetic field and a second magnet, also located on the cartridge housing, that emits the second magnetic field.

11. The docking station of claim 9, wherein the first and second sensors are positioned to detect a magnet, located on a cartridge housing of the data storage cartridge, that emits the first and second magnetic fields.

12. The docking station of claim 9, wherein the control module includes an RF tag reader, wherein the RF tag reader reads an RF tag on the data storage cartridge interfaced with the docking station to determine if the data storage cartridge has WORM write-protection.

13. The docking station of claim 12, wherein the control module indicates an error when either one or both of the first and second magnetic sensors do not detect any magnetic field, but the RF tag indicates the data storage cartridge has WORM write-protection.

14. The docking station of claim 9, wherein the control module reads a media information header on a data storage media of the data storage cartridge to determine if the data storage cartridge has WORM write-protection.

15. The docking station of claim 14, wherein the control module indicates an error when either one or both of the first and second magnetic sensors do not detect a magnetic field, but the media information header indicates the data storage cartridge has WORM write-protection.

16. A system comprising:
a data storage cartridge, the data storage cartridge including,
  a cartridge housing,
  a data storage medium within the cartridge housing, and
  one or more magnets located on the cartridge housing; and
a docking station for data storage cartridges, the docking station including,
  an interface to receive the data storage cartridge,
  a first magnetic sensor that sends a first signal to indicate detection of a first magnetic field of the one or more magnets,
  a second magnetic sensor that sends a second signal to indicate detection of the first magnetic field or a first magnetic field of the one or more magnets, and
  a control module that receives the first and second signals, wherein the control module implements WORM write-protection for the data storage cartridge when the first and second magnetic sensors each detect magnetic fields.

17. The system of claim 16, further comprising:
a cartridge store including a plurality of data storage cartridges; and
a robotic arm to retrieve data storage cartridges from the cartridge store and place the data storage cartridges from the cartridge store within the interface of the docking station and to return data storage cartridges from the docking station to the cartridge store.

18. The system of claim 17,
wherein the docking station is a first docking station,
further comprising a second docking station,
wherein the robotic arm places the data storage cartridges from the cartridge store within the interface of the first docking station and an interface of the second docking station,
wherein the first docking station receives data storage cartridges including magnetic tape and the second docking station receives data storage cartridges including optical discs.

19. The system of claim 16, wherein the control module includes an RF tag reader, wherein the RF tag reader reads an RF tag on the data storage cartridge interfaced with the docking station to determine if the data storage cartridge has WORM write-protection.

20. The system of claim 16, wherein the data storage cartridge comprises a tape cartridge, the data storage media comprises magnetic tape, and the docking station comprises a tape drive, wherein the tape drive reads a media information header on a magnetic tape to determine if the data storage cartridge has WORM write-protection.

* * * * *